United States Patent [19]

Wainwright

[11] Patent Number: 5,040,759
[45] Date of Patent: Aug. 20, 1991

[54] CAMERA MOUNT FOR TAKING PANORAMIC PICTURES

[76] Inventor: Andrew G. Wainwright, P.O. Box 278, Red Hook, N.Y. 12571

[21] Appl. No.: 548,238

[22] Filed: Jul. 5, 1990

[51] Int. Cl.$^5$ .................. F16M 11/08; G03B 37/00
[52] U.S. Cl. .................................. 248/186; 248/187; 248/289.1; 354/94; 354/293
[58] Field of Search ............ 248/176, 186, 187, 289.1, 248/349; 354/94, 292, 293, 294

[56] References Cited

U.S. PATENT DOCUMENTS

| | | | |
|---|---|---|---|
| 1,503,437 | 7/1924 | James | 354/94 |
| 4,258,966 | 3/1981 | Guabb | 248/349 X |
| 4,566,664 | 1/1986 | Donald | 248/349 |

Primary Examiner—Carl D. Friedman
Assistant Examiner—Derek J. Berger
Attorney, Agent, or Firm—Iman Abdallah

[57] ABSTRACT

A camera mount for taking panoramic pictures. A camera mounting plate is rotatably attached to a tripod mounting plate in a manner permitting the camera mounting plate to sweep an arc of rotation along the top surface of the tripod mounting plate. The tripod mounting plate has a convexly-curved forward edge and a protractor disposed adjacent the forward edge. A stationary detent is fixedly attached adjacent to the center of the protractor and a plurality of adjustable detents are disposed to each side of the stationary detent within respective detent slots disposed along the arc of rotation adjacent to the protractor. The camera mounting plate includes a camera mounting block that can be adjusted rearwardly and forwardly upon the camera mounting plate. A pointer integrally formed as part of the camera mounting plate includes a transparent eyeglass disposed above the protractor having a datum to facilitate alignment of the pointer with the protractor. A bubble level is also provided to facilitate leveling of the camera mounted on the device of the present invention.

20 Claims, 3 Drawing Sheets

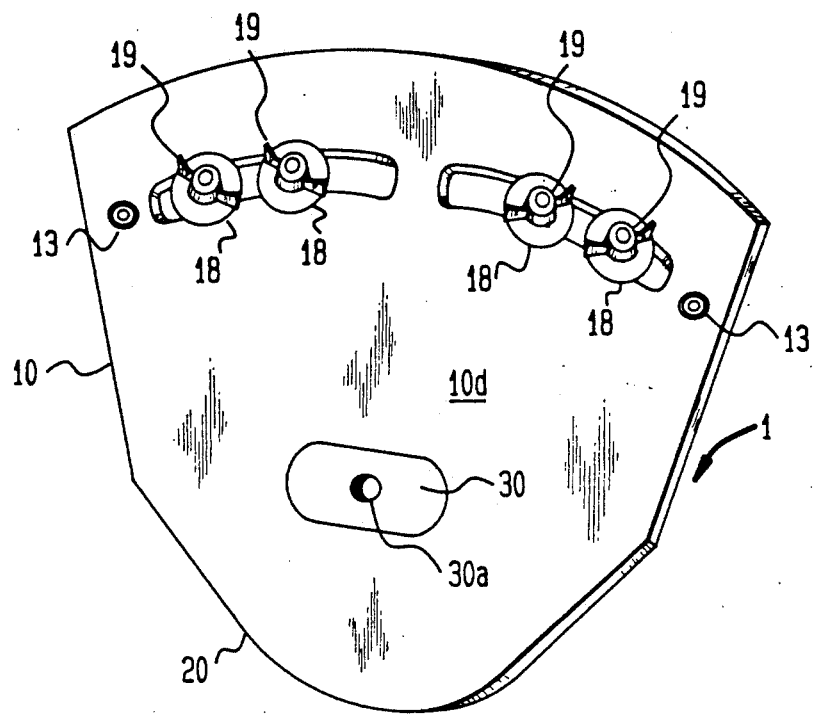
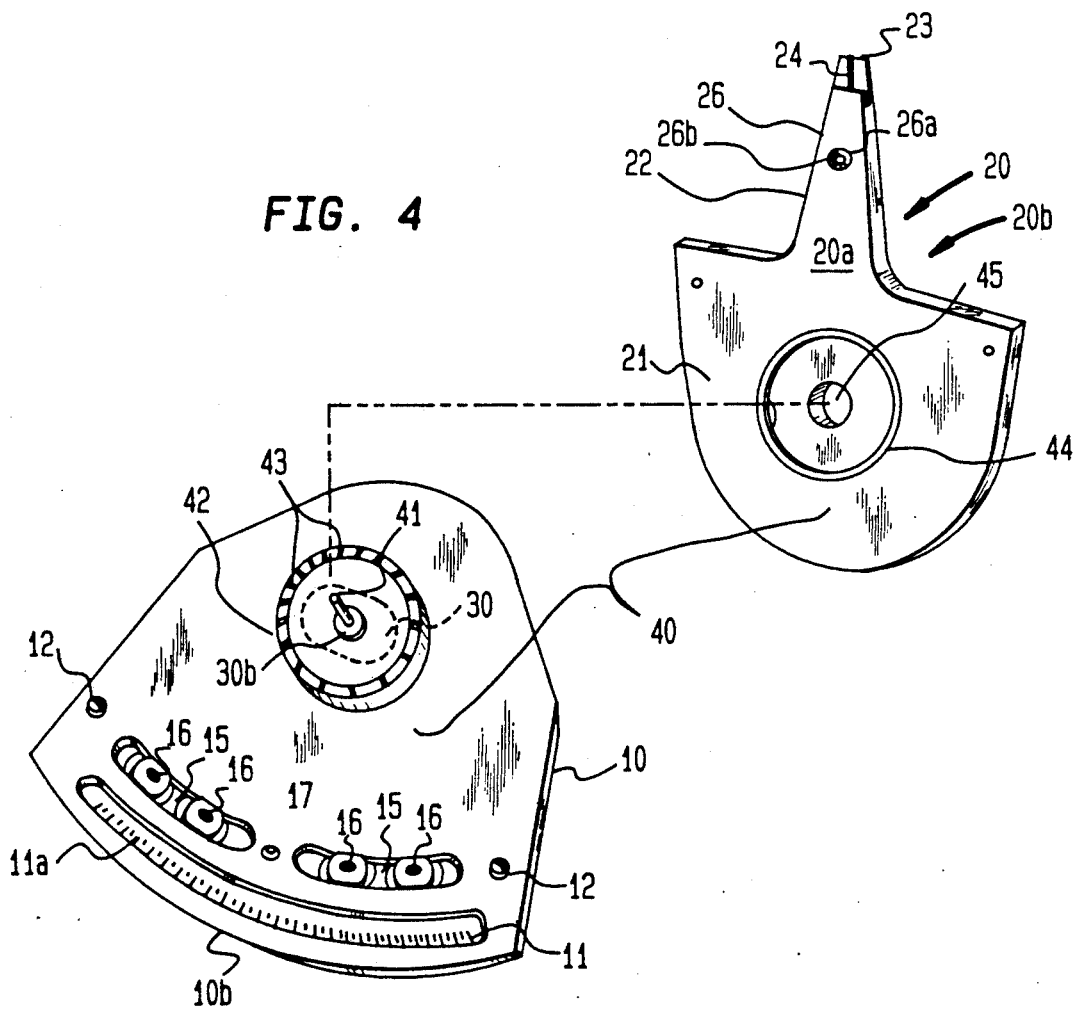

CAMERA MOUNT FOR TAKING PANORAMIC PICTURES

BACKGROUND OF THE INVENTION

The present invention generally relates to camera mounts and in particular to camera mounts for taking panoramic pictures.

The aberrations and distortions that occur at the extremes of a photograph of a panoramic view and the problems of properly aligning film strips to produce a panoramic picture are well known in the prior art. The existing methods of creating panoramic pictures for multi-screen audio-visual slide shows also produce pictures of low quality. The generally-used method of producing slide panoramas involves taking a single slide and enlarging 8 mm by 36 mm sections of the slide onto five slides and thereafter projecting the five slides onto three screens. Since the five slides are second-generation copies of a very small section of an original slide, the resulting quality of the panoramic picture is often poor. Furthermore, if the original slide contains wide-angle distortion, that distortion will also be reproduced in the resulting slide panorama.

The generally-used method of enlarging small sections of a single slide to create a panoramic picture remains valid for many cases, for example, when creating a panoramic picture from an existing slide, from stock file slides, or when using slides shot with long (telephoto) lenses. The camera mount of the present invention however discloses an additional tool for the photographer useful for creating film strips known at the time of shooting to be used to create panoramic pictures.

A panoramic camera is disclosed in U.S. Pat. No. 2,111,854 to Gasso et al. including adjustable lenses to vary the focal length of the lenses in mathematical proportions to the varying distances of objects in the panoramic view. In U.S. Pat. No. 3,183,810 to Campbell et al. a motor-driven panoramic camera is disclosed having automatic means for stopping the angular sweep of the camera and adjustments for changing the angle of sweep and for making the sweep symmetrical or unsymmetrical.

U.S. Pat. No. 1,282,177 to Blankenhorn discloses a method and apparatus for making panoramic pictures comprising marking the film as the film is advanced and the camera rotated. A camera mount useful for taking stereoscopic or panoramic pictures is disclosed in U.S. Pat. No. 2,782,700 to Ianuzzi. In the most closely-related prior art known to the Applicant shown in U.S. Pat. No. 1,503,437 to James, a motor-driven camera attachment for taking panoramic pictures is disclosed which moves camera film in relation to the angular rotation of the camera attachment. However, the apparatus of the James invention does not provide the advantages of the present disclosure relating to simplicity of construction and flexibility in operation.

SUMMARY OF THE INVENTION

The camera mount of the present invention includes a stationary tripod mounting plate having a plurality of detent means, and a camera mounting plate rotatably attached to the tripod mounting plate that includes a roller bearing that engages the detent means. Thereby, the attached camera can be rotated through an arc of rotation to shoot the panoramic view without the necessity of visually observing the angular distance traversed by the camera. In a preferred embodiment of the camera mount of the present disclosure a plurality of adjustable detents are disposed to each side of a centrally-disposed stationary detent to provide means for adjustments necessary for varying uses and equipment.

An object of the present invention is to provide a camera mount for taking panoramic pictures.

Another object of the present invention is to provide a manually-controllable camera mount for taking accurate panoramic pictures.

A further object of this invention is to provide a camera mount that can be used with a plurality of types of cameras.

Another object of this invention is to provide means to create wide-field panoramas absent the limitations of wide-angle photography, such as the stretching of round objects into ovals near the corners thereof.

It is also an object of this invention to provide means to create panoramic pictures of higher quality than available utilizing present methods.

Another object of this invention is to provide means for production of creative panoramas.

It is also an object of this invention to provide effective means of photographing groups of people with improved resolution.

Another object of the present invention is to provide a camera mount that can create slide panoramas that retain full x-synchronization.

A still further object of the present invention is to provide a camera mount for taking panoramic pictures having detent means for a rotating camera mount to eliminate having to visually check the position of a camera at each shot.

It is also an object of this invention to provide adjustable detent means in a camera mount.

These and other objects and advantages of the camera mount of the present disclosure will be readily understood by those skilled in the art from the following description of a preferred embodiment, claims and appended drawings.

BRIEF DESCRIPTION OF THE DRAWINGS

FIG. 3 is a bottom perspective view of the camera mount of the present invention.

FIG. 4 is an exploded perspective view illustrating the means for rotatable attachment of the tripod mounting plate and the camera mounting plate.

DESCRIPTION OF A PREFERRED EMBODIMENT

Figure 1:
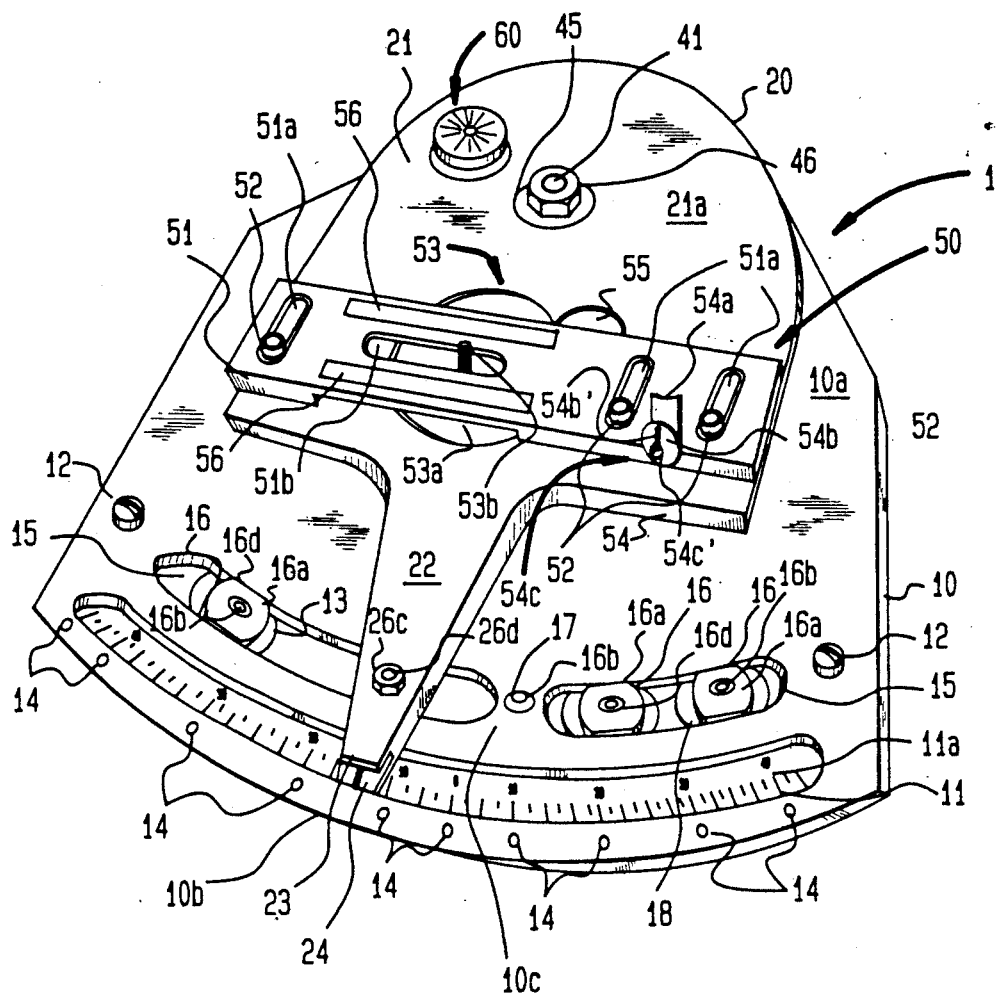
FIG. 1 is a top perspective view of the camera mount of the present invention.

FIG. 1 illustrates in a top perspective view the panoramic camera mount 1 of the present invention. Camera mount 1 generally comprises a tripod mounting plate 10 and a camera mounting plate 20, the camera mounting plate 20 being rotatably attached to the top surface 10a of the tripod mounting plate 10.

Tripod mounting plate 10, preferably formed from dense plastic material to limit the weight of camera mount 1, is formed having a convexly-curved forward edge 10b. Adjacent to the forward edge 10b of the tripod mounting plate 10 a protractor 11 is disposed on the top surface 10a of the tripod mounting plate 10, said protractor 11 having a lateral curvature corresponding to the curvature of the forward edge 10b of the tripod mounting plate 10. Protractor graduations 11a are marked on said protractor 11 to provide means to measure angular positioning of the camera mounting plate 20 as hereinafter described in greater detail. In the preferred embodiment of the camera mount 1 shown in FIG. 1, the protractor 11 extends from approximately fifty degrees to the right of a central detent 17 and fifty degrees to the left of the central detent 17 providing an arc of rotation of approximately one hundred degrees. However, the sweep of the camera mounting plate 20 and the related protractor 11 may encompass three hundred sixty degrees without departing from the spirit and scope of the present invention. Camera mounting plate stops 12 are disposed on the top surface 10a to each side of the tripod mounting plate 10 to provide means to limit the angular rotation of the camera mounting plate 20. In the preferred embodiment the stops 12 are threadedly attached to stop screw holes 13 (FIG. 3) which extend vertically through the body of said tripod mounting plate 10. Major position markings 14 are disposed on the top surface 10a of the tripod mounting plate 10 between the protractor 11 and the forward edge 10 of the tripod mounting plate 10. The major position markings 14 are shown in FIG. 1 to be disposed adjacent the 40-degree graduation 11a on the protractor 11 and at ten-degree increments thereafter.

To the opposite side of the protractor 11 and adjacent thereto, paired detent slots 15 are formed having a lateral curvature corresponding to the lateral curvature of the protractor 11. Detent slots 15 receive a plurality of adjustable camera mounting plate detents 16 in sliding engagement. A central, stationary camera mounting plate detent 17 is disposed in the top surface 10a of a brace portion 10c of the tripod mounting plate 10 between said detent slots 15 adjacent the 90-degree graduation 11a of the protractor 11 along a curve defining the lateral disposition of the plurality of adjustable detents 16. The brace portion 10c not only serves to receive the stationary detent 17 but also serves to facilitate prevention of warping and mis-alignment of the protractor 11 and the forward edge 10b of the tripod mounting plate 10 relative to said camera mounting plate 20.

Figure 2:
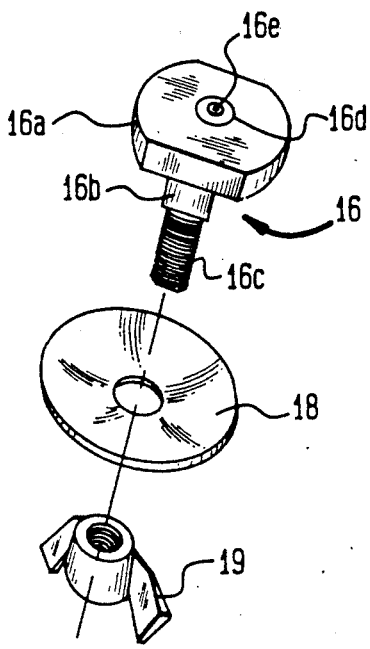
FIG. 2 is an exploded perspective view of the adjustable detent of the invention and the detent mounting means.

The adjustable detents 16 are preferably formed from hardened steel and as can be best seen in FIG. 2 include a detent body 16a having a body extension 16b co-extensive with a threaded stem 16c disposed from the lower surface of said body extension 16b, and a raised detent head 16d disposed on the upper surface of said detent body 16a. Detent body 16a slidably engages the detent slots 15 of said tripod mounting plate 10 and can be fixedly positioned at various points along the detent slots 15 by means of a detent washer 18 which, as can be seen in FIG. 3, bears against the bottom surface 10d of the tripod mounting plate 10 and by threaded engagement of a detent wing nut 19 to the threaded stem 16c of said adjustable detent 16. Thereby the adjustable detents 16 can be easily positioned and secured without the use of tools other than the hands.

The raised detent head 16d includes a detent head hole 16e centrally disposed in said detent head 16d which receives a roller bearing 26 disposed in the bottom surface 20a (FIG. 4) of the camera mounting plate 20 as hereinafter described in greater detail The stationary detent 17 is substantially a detent head 16d fixedly attached to the top surface 10a of the brace portion 10c of the tripod mounting plate 10.

Referring to the bottom perspective view of the camera mount 1 shown in FIG. 3, it can be seen that tripod mounting means 30 including a threaded orifice 30a for receipt of the tripod screw (not shown) is disposed in the bottom surface 10d of the tripod mounting plate 10 for attachment of the camera mount 1 to a tripod (not shown).

In FIG. 1, the camera mounting plate 20 can be seen to be formed having a camera mounting plate main body 21 and a camera mounting plate pointer 22 integrally formed with said main body 21 and extending forwardly therefrom. An eyeglass 23, preferably transparent, is fixedly attached to the distal end of the plate pointer 22 disposed above the protractor graduations 11a, said eyeglass 23 having a datum line 24 longitudinally disposed thereon. Camera mounting plate 20 is preferably formed from aluminum to prevent deformation of said camera mounting plate 20 during operation of the camera mount 1 in cold temperatures.

Camera mounting plate 20 is rotatably attached to the tripod mounting plate 10 by rotatable mounting means 40 which engage the main body 21 of said camera mounting plate 20. As can be seen in FIG. 4 rotatable mounting means 40 includes a threaded pivot stem 41 which is integrally formed and co-extensive with a tripod mounting means extension 30b which extends upwardly through the tripod mounting plate 10 from said tripod mounting means 30. Pivot stem 41 is preferably disposed five inches from the forward edge 10b of the tripod mounting plate 10. A first ring plate 42, preferably formed from hardened steel, is rotatably disposed in the top surface 10a of said tripod mounting plate 10 concentric to said pivot stem 41. The first ring plate 42 includes a plurality of thrust bearings 43 rotatably disposed along its upper portion. A second ring plate 44, preferably formed from hardened steel, is fixedly disposed in the bottom surface 20a of the camera mounting plate 20 concentric to a pivot stem orifice 45 which receives the pivot stem 41 in rotatable engagement. When the tripod mounting plate 10 and camera mounting plate 20 are attached the first ring plate 42 and second ring plate 44 are brought in bearing engagement and said camera mounting plate 20 can be rotated relative to said tripod mounting plate 10 by the sliding movement of said second ring plate 44 against the thrust bearings 43 of said first ring plate 42. A pivot stem washer inset (not shown) is formed in the top surface 21a of the main body 21 and receives a pivot stem washer 45. A pivot stem nut 46 threadedly engages the pivot stem 41 to attach the tripod mounting plate 10 and camera mounting plate 20 (FIG. 1).

The roller bearing 26 selectively received by the detent head holes 16e of said adjustable detents 16 and said stationary detent 17 as heretofore mentioned, is fixedly attached to the bottom surface 20a of the camera mounting plate pointer 22 adjacent the eyeglass 23. Roller bearing 26 comprises a roller ball 26a rotatably engaged by a roller ball cap 26b. Roller ball cap 26b provides the fixed support of the roller ball 26a in the bottom surface 20 of the camera mounting plate 20.

Referring again to FIG. 1 it can be seen that roller bearing 26 is fixedly attached to the camera mounting plate pointer 22 by means of a roller bearing nut 26c which threadedly engages a roller ball cap stem 26d extending through the plate pointer 22 from said roller ball cap 26b. FIG. 1 further illustrates camera attachment means 50 disposed on the main body 21 of the camera mounting plate 20. Camera attachment means 50 includes a camera mounting block 51 having a plurality of longitudinal adjustment slots 51a disposed in parallel alignment with the datum line 24 in said eyeglass 23. Mounting block locking means 52, preferably Allen head screws, are disposed within said longitudinal adjustment slots 51a to provide means to selectively adjust the camera mounting block 51 forwardly and rearwardly upon the camera mounting plate 20. A lateral slot 51b is disposed perpendicular to said longitudinal adjustment slots 51a and therebetween for receipt of a camera mounting screw 53 in lateral sliding engagement. Camera mounting screw 53 includes a screw head 53a that extends beyond the sides of said camera mounting block 51 and a screw stem 53b that extends through said lateral slot 51b and engages the threaded orifice (not shown) as generally provided in the bottom wall of professional cameras. The lateral adjustability of an attached camera provided by the lateral slot 51b in combination with the camera mounting screw 53 permits various types of cameras to be utilized with the camera mount 1 of the present invention.

Figure 5:
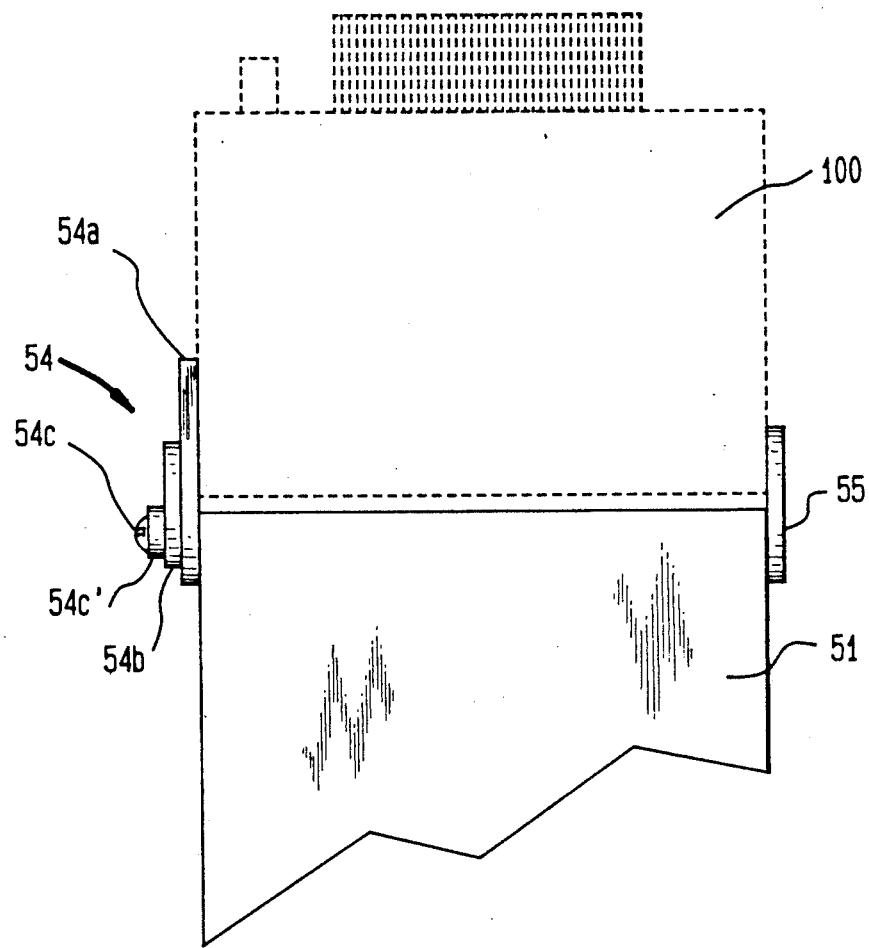
FIG. 5 is a fragmentary side elevational view of the camera attachment means.

A forward camera brace 54 is attached to a forward side of said camera mounting block 51 and a rearward camera brace 55 is attached to a rearward side of said camera mounting block 51. The rearward camera brace 55 is substantially a plate washer fixedly attached to said camera mounting block 51. Forward camera brace 54 includes a resilient camera support 54a which extends above said camera mounting block 51. A plate washer 54b is disposed adjacent to the forward face of resilient support 54a. Plate washer 54b includes a longitudinal washer slot 54b' which selective receives a washer screw 54c having an integrally formed screw head ring 54c'. Plate washer 54b can thereby be adjusted vertically and laterally about washer screw 54c. Forward camera brace 54 can first be set to mount a particular camera. To adjust forward camera brace 54 to mount a different camera, loosen washer screw 54c. Then fixedly attach plate washer 54b at a new position adjacent to the forward face of camera 100 (FIG. 5) by tightening washer screw 54c with the screw head ring 54c' bearing against the forward face of plate washer 54b. Strips of friction tape 56 are attached to said mounting block 51 to each side of the lateral slot 51b to facilitate the prevention of sliding movement of the attached camera when positioned as desired. A bubble level 60 is fixedly attached to the top surface 21a of the main body 21 of the camera mounting plate 20 to provide means for aligning the camera mount 1 to assure confluence of a horizon in the various film strips of the panoramic picture.

The camera mount 1 of the present invention allows a photographer to create panoramas for multi-screen slide presentations. In conjunction with a professional pin-registered 35 mm camera and lens combination, and soft-edge masks and slide mounts, as manufactured by Wess Plastics Inc., Farmingdale, New York, for example, three-screen, 50% overlap panoramas (five slides projected onto three screens) and all similar panoramas, for example, two-screen, 50% overlap panoramas may be created. Butt slide panoramas may also be created with the camera mount 1 of the present invention. It is preferred that a pin-registered Nikkon F3 35 mm camera, as modified by Double-M Industries of Austin, Tex., be utilized with the camera mount 1 of the present invention. Pin-registered cameras create panoramas with the most accuracy and are more suitable for making duplicates. Utilizing the camera mount 1 disclosed herein for three-screen slide presentations, 112-degree wide-field panoramas can be created with only the distortion of a 50 mm lens. An 85 mm lens creates 70° panoramas; a 35 mm lens creates 152° panoramas. Print panoramas having a 3:1 or 4.5:1 aspect ratio can also be created. Camera mount 1 of the present invention may be utilized with color or black/white film.

The following discussion illustrates operation of the camera mount 1 to create slides for panoramic presentations. The camera mount 1 is first attached to a tripod by attaching the tripod to the threaded orifice 30a of the tripod mounting means 30. The camera and lens to be utilized are then fastened to the camera mounting screw 53 of the camera mounting block 51 by engaging the screw stem 53b within the bottom of the camera (professional cameras include a threaded opening in the bottom of the camera for mounting the camera to a tripod and the like) and tightening the camera mounting screw 53 thereto by rotating the screw head 53a. The camera should be laterally adjusted on the mounting block 51 prior to tightening the camera mounting screw 53 by sliding the camera mounting screw 53 with the camera attached within the lateral slot 51b of said mounting block 51 so that the center of the iris diaphragm of the camera is aligned with the pivot stem 41 of the rotatable mounting means 40. When this step is completed the respective detent wing nuts 19 are loosened from the adjustable detents 16. Seat the roller ball 26b of the roller bearing 26 into the respective detent head holes 16e of the respective adjustable detents 16 and the stationary detent 17 in turn. Utilizing a 50 mm 1.8 AIS Nikkon lens, the adjustable detents 16 are respectively set at 19 degrees and 38 degrees (a 38/19 setting) to each side of the centrally-disposed stationary detent 17 as a starting detent setting. For 50% overlap panoramic slides, whatever wider setting is used, the narrower detent setting should be exactly one-half of the wider setting. The respective detent wing nuts 19 should be gently tightened against the respective detent washers 18 as each adjustable detent 16 is set.

It is very important that the tripod does not pivot or shift during the panning operation of the camera mount 1 since accidental pivoting of the tripod will flaw the panoramic picture. Therefore, practice rotations of the camera mount 1 should be made by grasping the camera mounting block 51 and rotating the camera mounting plate 20 through the arc of rotation stopping at each detent 16, 17. Also, since 50 mm lenses from different manufacturers have a slightly different focal length, a test roll of film should be shot at 40/20, 39/19.5, 38/19, 37/18.5 and 36/18 settings to determine the appropriate detent settings for a particular lens. Furthermore, when a horizon or rectilinear architecture is to be included in the panoramic picture, the camera mount 1 should be aligned with the horizon or line of the architecture by utilizing the bubble level 60 so that the horizon or line of the architecture will meet smoothly in the projected slides. Once the appropriate detent settings have been determined and set, the photographer need only set exposure, compose the picture, and focus the camera for each shot. To tell which detent setting is best for a particular group of slide projectors, the slides for various detent settings must be projected onto a screen where it can be readily seen which panoramic pictures properly overlap. Although differences in projector alignment are generally small, the adjustability of the camera mount 1 of the present invention permits the creation of more accurate panoramic slides, since neighboring slides can be fine-tuned and adjusted to a particular projector alignment and camera lens since the adjustable detents 16 can be adjusted to within one-tenth of one degree on the five-inch radius of the camera mount 1. The forward and rearward adjustment of the camera mounting block 51 available by means of the longitudinal adjustment slots 51a permits compensation for variations in focal distance while maintaining the iris diaphragm aligned with the pivot stem 41.

With the preliminary detent settings and adjustments of the camera mounting block 51 completed, the pictures for the panoramic slides are now ready to be taken. To enable quick recognition of the film strips as panoramic pictures instead of a series of separate, single images, the sequence of pictures should be shot from the left side of the panoramic view to its right side. Starting at the left side, the camera should be focused, the exposure set manually (auto-exposure programs should not be used), and the frame shot. The camera mounting plate 20 should be rotated to the right until the next detent 16 is engaged and the above steps are repeated. Sequentially, the camera mounting plate 20 is rotated through each of the detents 16, 17 to create the full panoramic picture. After the full view is shot, the scene should be shot again using a half-stop bracket. For a three-screen, 50% overlap panoramic picture, a frame should be shot at all five detent settings. For a two-screen, 50% overlap panoramic picture, frames should be shot only at the narrower adjustable detent settings and at the centrally-disposed, stationary detent 17.

When it is not practical to shoot sequential frames at successive detent settings, the camera mount 1 of the present invention permits accurate retention of the panoramic view.

The five slides produced for a three-screen, 50% overlap panoramic picture are then mounted in slide mounts, for example, Wess 002 SP slide mounts, with the appropriate Wess soft-edge masks. The slides may thereafter be projected on the screens to "re-assemble" them into a panoramic picture.

For print panoramic pictures, shots are taken only at the stationary detent 17 and at the wider adjustable detents 16, for example, at the stationary detent 17 and at the 38-degree detent setting to each side of the stationary detent 17. When printing with full-frame-filled negative carriers the detent settings are the same as for slide films. Prints shot with color negative film and processed in a one-hour processing laboratory however must be shot at adjusted detent settings, for example at 34-degree detent settings to each side of the stationary detent 17 for a 50 mm lens, to compensate for cropping done at the processing laboratory.

While some familiarity with the principals and guidelines of multi-screen panoramic projection is necessary for successful panoramic photography, the camera mount 1 of the present invention greatly simplifies the alignment of the various frames which make up the panoramic picture.

Various changes and modifications to the preferred embodiment of the camera mount 1 of the present invention may be made without departing from the spirit and scope of the present disclosure. Such changes and modifications within the coverage of the language of the claims hereinafter recited are intended to be included as part of the present disclosure.

Therefore, in view of the foregoing, I claim:

1. A camera mount for taking panoramic pictures comprising
    a tripod mounting plate having a top surface and a bottom surface, tripod mounting means being disposed on the bottom surface of said tripod mounting plate and a plurality of detents being disposed on the top surface of said tripod mounting plate; and
    a camera mounting plate having a top surface and a bottom surface, said camera mounting plate being rotatably attached to the top surface of said tripod mounting plate by rotatable mounting means to circumscribe an arc of rotation, said camera mounting plate having a roller bearing fixedly attached to the bottom surface of said camera mounting plate which selectively engages the plurality of detents, camera attachment means being disposed on the top surface of said camera mounting plate.

2. A camera mount as described in claim 1 wherein said tripod mounting plate is formed having a forward edge convexly curved to correspond to the arc of rotation circumscribed by said camera mounting plate.

3. A camera mount as described in claim 2 wherein the arc of rotation circumscribed by said camera mounting plate equals 100 degrees.

4. A camera mount for taking panoramic pictures comprising
    a tripod mounting plate having a top surface and a bottom surface, tripod mounting means being disposed on the bottom surface of said tripod mounting plate and a plurality of detents being disposed on the top surface of said tripod mounting plate; and
    a camera mounting plate having a top surface and a bottom surface, said camera mounting plate being rotatably attached to the top surface of said tripod mounting plate by rotatable mounting means to circumscribe an arc of rotation, said camera mounting plate having a roller bearing fixedly attached to the bottom surface of said camera mounting plate which selectively engages the plurality of detents, camera attachment means being disposed on the top surface of said camera mounting plate,
    said plurality of detents being slidably adjustable along a line parallel to the arc of rotation circumscribed by said camera mounting plate.

5. A camera mount for taking panoramic pictures comprising:
    a tripod mounting plate having a top surface and a bottom surface, tripod mounting means disposed on the bottom surface of said tripod mounting plate and a plurality of detents disposed on the top surface of said tripod mounting plate, and
    a camera mounting plate having a top surface and a bottom surface, said camera mounting plate being rotatably attached to the top surface of said tripod mounting plate by rotatable mounting means to circumscribe an arch of rotation, wherein said rotatable mounting means comprises a threaded pivot stem integrally formed and co-extensive with said tripod mounting means and extending upwardly from said tripod mounting plate, a first ring plate and a second ring plate,
    said first ring plate being rotatably disposed in the top surface of said tripod mounting plate concentric to said pivot stem, said first ring plate including a plurality of thrust bearings rotatably disposed along the upper portion of said first ring plate;

said second ring plate being fixedly disposed in the bottom surface of the camera mounting plate concentric to a pivot stem orifice which receives the pivot stem in rotatable engagement, the first ring plate and the second ring plate being brought into bearing engagement when the pivot stem is disposed through the pivot stem orifice;

said pivot stem being fixedly engaged to rotatably attach said tripod mounting plate and said camera mounting plate by a complimentarily threaded pivot stem nut;

said camera mounting plate having a roller bearing fixedly attached to the bottom surface of said camera mounting plate which selectively engages the plurality of detents, camera attachment means being disposed on the top surface of said camera mounting plate.

6. A camera mount as described in claim 5 wherein the pivot stem is radially displaced 5" from a forward edge of said tripod mounting plate.

7. A camera mount as described in claim 5 wherein said first ring plate and said second ring plate are formed from hardened steel.

8. A camera mount as described in claim 5 wherein said roller bearing comprises a roller ball rotatably engaged by a roller ball cap, said roller ball cap being fixedly attached to said camera mouting plate.

9. A camera mount for taking panoramic pictures comprising
 a tripod mounting plate having a top surface and a bottom surface, tripod mounting means disposed on the bottom surface of said tripod mounting plate and a plurality of detents disposed on the top surface of said tripod mounting plate, and
 a camera mounting plate having a top surface and a bottom surface, said camera mounting plate being rotatably attached to the top surface of said tripod mounting plate by rotatable mounting means to circumscribe an arch of rotation, said camera mounting plate having a roller bearing fixedly attached to the bottom surface of said camera mounting plate which selectively engages the plurality of detents, camera attachment means being disposed on the top surface of said camera mounting plate, said camera attachment means comprising a camera mounting block including a plurality of longitudinal adjustment slots disposed in parallel alignment with a datum line disposed on said camera mounting plate, a lateral slot disposed perpendicular to said plurality of longitudinal adjustment slots, and a camera mounting screw which slidably engages said lateral slot, said camera mounting screw having a screw head that extends beyond the sides of said camera mounting block and a screw stem that extends through said lateral slot in slidable engagement, said camera mouting block being selectively adjustable forwardly and rearwardly by means of mouting block locking means disposed within said plurality of longitudinal adjustment slots.

10. A camera mount as described in claim 9 further including a protractor having protractor graduations disposed thereon along the arc of rotation of said camera mounting plate at a forward edge of said tripod mounting plate.

11. A camera mount as described in claim 10 wherein the plurality of detents comprises a stationary detent disposed adjacent to the center of said protractor and a plurality of adjustable detents disposed to each side of said stationary detent, said adjustable detents being slidably adjustable along a line parallel to the arc of rotation of said camera mounting plate.

12. A camera mount as described in claim 9 wherein said camera mounting plate comprises a camera mounting plate main body and a camera mounting plate pointer integrally formed with said camera mounting plate main body and extending forwardly therefrom, said rotatable mounting means engaging the camera mounting plate main body, said camera mounting plate pointer having an eyeglass fixedly attached to the distal end of said camera mounting plate pointer 13. A camera mount as described in claim 12 wherein said eyeglass is transparent having a datum line longitudinally disposed thereon.

14. A camera mount as described in claim 13 wherein said roller bearing is attached adjacent to said eyeglass.

15. A camera mount as described in claim 9 further including a forward camera brace attached to a forward side of said camera attachment means and a rearward camera brace attached to a rearward side of said camera attachment means.

16. A camera mount as described in claim, 15 wherein said forward camera brace includes resilient support means for support of a camera.

17. A camera mount as described in claim 9 further including a bubble level fixedly attached to said camera mounting plate.

18. A camera mount as described in claim 9 wherein said camera mounting plate is formed from aluminum material.

19. A camera mount for taking panoramic pictures comprising
 a tripod mounting plate having a top surface, a bottom surface, and a convexly-curved forward edge, the bottom surface of said tripod mounting plate having means for selective attachment of said tripod mounting plate to a tripod, the top surface of said tripod mounting plate having a protractor disposed adjacent to said forward edge and major position markings disposed between said protractor and said forward edge at equal angular increments, said tripod mounting plate having a stationary detent disposed adjacent to the center of said protractor and a plurality of adjustable detents disposed to each side of said stationary detent in respective detent slots disposed parallel to said protractor, said plurality of adjustable detents being slidably disposed and selectively fixable within said respective detent slots, respective rotation stops being disposed at outward ends of said detent slots; and
 a camera mounting plate having a top surface and a bottom surface, said camera mounting plate having a main body and a pointer, said pointer extending from said main body and including a transparent eyeglass disposed at the distal end thereof, said eyeglass being disposed above the protractor and having a datum line disposed thereon, said camera mounting plate having a roller bearing attached to the bottom surface of said camera mounting plate which selectively engages the stationary detent and said plurality of adjustable detents, said camera mounting plate being rotatably attached to said tripod mounting plate by rotatable mounting means disposed at a radial distance of 5" from said forward edge, said camera mounting plate further including camera attachment means selectively adjustable on said main body and having a forward camera brace and a rearward camera brace attached to opposing sides of said camera attachment means.

20. A camera mount as described in claim 19 further including a bubble level disposed on the main body of said camera mounting plate.

* * * * *